United States Patent [19]

Ikeda

[11] Patent Number: 5,280,624
[45] Date of Patent: Jan. 18, 1994

[54] CIRCUIT STRUCTURE OF FUZZY CONTROL PROCESSOR

[75] Inventor: Hiroshi Ikeda, Kanagawa, Japan

[73] Assignee: Nissan Motor Co., Ltd., Yokohama, Japan

[21] Appl. No.: 828,841

[22] Filed: Jan. 31, 1992

[30] Foreign Application Priority Data

Feb. 8, 1991 [JP] Japan .................................. 3-017652

[51] Int. Cl.[5] .............................................. G06F 15/18
[52] U.S. Cl. ......................................... 395/3; 395/11; 395/900
[58] Field of Search ...................... 395/3, 11, 900, 904, 395/906; 355/208

[56] References Cited

U.S. PATENT DOCUMENTS

| | | | |
|---|---|---|---|
| 4,864,490 | 9/1989 | Nomoto et al. | 395/906 |
| 4,875,184 | 10/1989 | Yamakawa | 395/3 |
| 4,985,824 | 1/1991 | Husseiny et al. | 395/11 |
| 5,012,430 | 4/1991 | Sakurai | 395/11 |
| 5,029,314 | 7/1991 | Katsumi et al. | 355/208 |
| 5,051,932 | 9/1991 | Inoue et al. | 395/906 |
| 5,057,866 | 10/1991 | Hill, Jr. et al. | 395/904 |
| 5,131,071 | 7/1992 | Tsutsumi et al. | 395/3 |
| 5,142,664 | 8/1992 | Zhang | 395/3 |
| 5,149,472 | 9/1992 | Suganuma | 395/900 |
| 5,165,011 | 11/1992 | Hisano | 395/11 |

OTHER PUBLICATIONS

IEEE Journal on Solid-State Circuits, vol. 25, No. 2, "A VLSI Fuzzy Logic Controller with Reconfigurable Cascadable Architecture", H. Watanabe, pp. 376-382, 1990.

IEEE Transaction on Systems, Man and Osbernetics, vol. 20, No. 2, "Fuzzy Logic in Control Systems: Fuzzy Logic Controller-Part I", Chuen Chien Lee, pp. 404-418, 1990.

Togai and Watanabe, IEEE, The Second Conference on Artificial Intelligence Applications, "A VLSI Implementation of Fuzzy Interference Engine: Toward an Expert System on a Chip", pp. 192-197, Dec. 1985.

Primary Examiner—Michael R. Fleming
Assistant Examiner—Tariq R. Hafiz
Attorney, Agent, or Firm—Lowe, Price, LeBlanc & Becker

[57] ABSTRACT

A circuit structure for calculating a fuzzy inference for a fuzzy logic controller is disclosed in which a memory unit is divided into a first memory for storing a plurality of membership functions whose number corresponds to the number of fuzzy levels for respective input variables and into a second memory for storing a plurality of encoded fuzzy control linguistic rules. Then, the fuzzy levels in the form of grades are integrally accessed for the respective input variables into a plurality of registers together with the encoded fuzzy control linguistic rules so that the registers prepare the synthesized data of the fuzzy levels and membership functions in the one of the linguistic rule.

15 Claims, 4 Drawing Sheets if u=A1, then v=B1

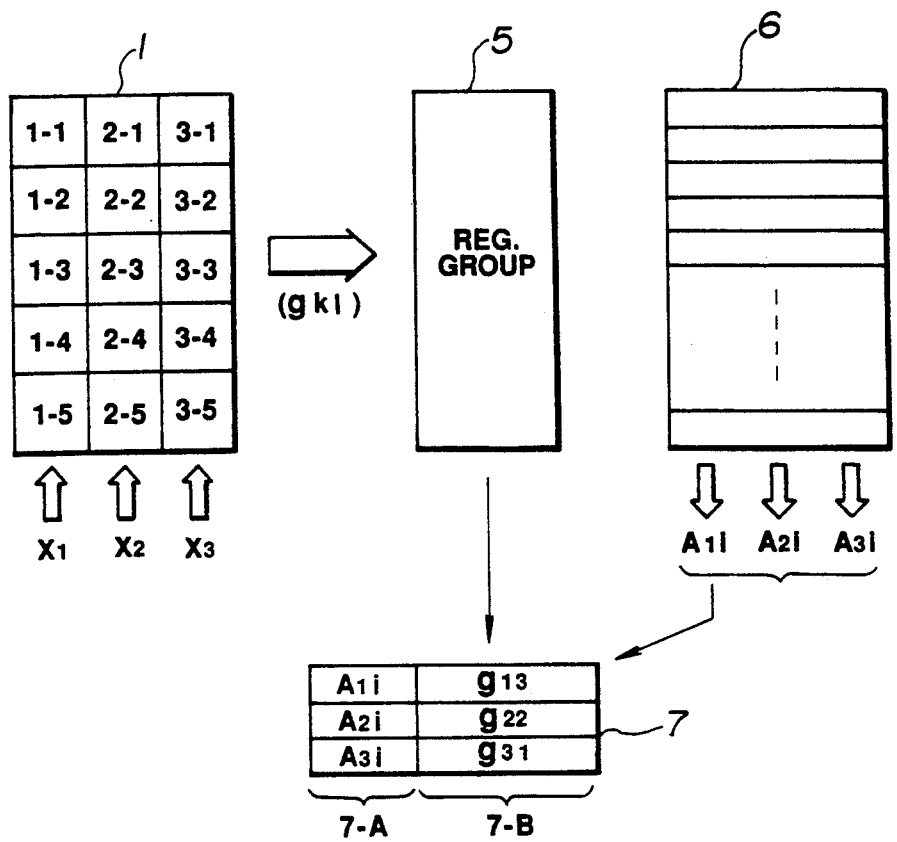

i = $r_1$ ~ $r_N$ --- RULE NO.
l = 1~5 ----- LEVEL NO.
k = 1~3 ----- INPUT NO.

CIRCUIT STRUCTURE OF FUZZY CONTROL PROCESSOR

BACKGROUND OF THE INVENTION (1) Field of the invention

The present invention relates to a circuit structure of a fuzzy logic controller (FLC) or a fuzzy control processor and particularly to a structure of a memory circuit of the fuzzy logic controller and its data processing technique.

(2) Description of the background art

A previously proposed fuzzy logic controller (FLC) is exemplified by a recorded paper called—M. Togai and H. Watanabe, Proceeding 2nd Conference on AI Application IEEE, 192/197 1985.

The disclosed fuzzy logic controller (FLC) includes first MIN logic elements each of which inputs one of input membership functions $A_1 \sim A_N$ and observed quantity A', first MAX logic elements which calculate matchings $\alpha_1 \sim \alpha_N$, second MIN logic elements each of which inputs one of output membership functions $B_1 \sim B_N$ and one of the matchings $\alpha_1 \sim \alpha_N$, a second MAX logic element which generalizes each conclusion derived by the second MIN logic element, and a defuzzifier which makes a decision of a specific operating variable V*.

A theoretical explanation of fuzzy inference used in the previously proposed fuzzy logic controller will be made as follows:

As shown in FIG. 1, suppose the following fuzzy logic linguistic rule.

$$\text{IF } u = A_i \text{ THEN } v = B_i \qquad (1).$$

In the rule of (1), $A_i$ and $B_i$ denote fuzzy quantities and may be words such as large , medium , or small or alternatively be approximate numerical values such as approximately five. In the fuzzy inference, these fuzzy words and fuzzy numerical values are accordingly made to correspond to their membership functions as shown in a bottom part of FIG. 1. In a table of FIG. 1, each lateral axis denotes an input ranges of u or v (in terms of angles, for example, $0° \sim 180°$) and each longitudinal axis denotes a magnitude (grade) by which the value of u or v belongs to a set of $A_i$. Then, the grade 1 is an input that any person can perceive large or small . As appreciated from FIG. 1, an intermediate grade is provided.

When the input is given in the form of the membership function as $u = A'$, the fuzzy logic controller described above calculates as follows: $A' \cap A_i$ (provided that $\cap$ denotes a minimum value logic), and thereafter derives $\cup (A' \cap A_i) = \alpha_i$. $\cup$ denotes a maximum value logic., $\alpha_i$ denotes a degree of matching for the i number of rule and indicates how degrees the corresponding rule has an effect. For example, if $\alpha_i = 0.5$, the degree of matching to which a conclusion of the rule is matched is half, i.e., it is not known well. Next, $\alpha_i \cap B_i$, i.e., a head portion of a conclusion portion of an area of $B_i$ is cut out. Since the rule is not applied only to $\alpha_i$, the conclusion portion is clamped by $\alpha_i$. As described above, since the conclusions of the respective rules are derived in the form of the output membership functions, the conclusions are generalized by calculating $\cup (\alpha_i \cap B_i)$. Since a logic of OR serves to connect between the rules, the logic of OR in the fuzzy inference is calculated, i.e., $\cup$ (maximum value logic) is carried out. Thus, the conclusion of B' is derived in the form of the output membership function. However, this indicates the degrees of the respective output values. Therefore, if, e.g., a weight center of the output membership function of B' is derived to output a final operating variable V*. In this way, in the fuzzy logic control the operating variable V* can be derived by generally inferring the fuzzy control result on the basis of a plurality of control linguistic rules according to the input A'.

The above-described fuzzy inference operation is described similarly in an English literature titled "A VLSI Fuzzy Logic Controller with Reconfigurable, Cascadable Architecture" by Hiroyuki Watanabe, Wayne D. Dettloff, and Kathy E Yount in IEEE Journal On Solid-State Circuits, Vol. 25, No. 2, on April, 1990.

In details, the fuzzy logic operators $\cup$, $\cap$ are provided in the form of hardware in the MIN logic elements and the MAX logic elements. Each membership function is stored in a memory circuit of the fuzzy logic controller and is read out at an appropriate timing to be transmitted to the respective logic elements. In the example described above, the membership functions are serially accessed. Although a memory capacity may be minimized, a speed of executing the fuzzy inferences becomes remarkably reduced as the number of rules are increased.

An English literature of IEEE CICC, 12.4.1-12.4.5, 1989 by W. D. Dettloff, K. E. Yount, and H. Watanabe exemplifies specific structures of fuzzy logic, defuzzifier, and MIN logic calculation unit.

The above-identified English literature titled "A VLSI Fuzzy Logic Controller with Reconfigurable, Cascadable Architecture" by Hiroyuki Watanabe, Wayne D. Dettloff, and Kathy E Yount in IEEE Journal On Solid-State Circuits, Vol. 25, No. 2, on April, 1990 also exemplifies the same specific structures described above.

In the specific structures disclosed in the latter literature, the membership functions are parallel accessed until 102 rule and high speed inference can be executed. However, the memory capacity becomes large such that about 70% of a chip area is occupied.

Problems raised in the previously proposed fuzzy logic controllers will be explained below.

First, it is necessary to provide a considerably large capacity of memory circuit in order to memorize the plurality of membership functions (in arbitrary forms).

For example, suppose that the number of input variables $x_i$ are three, the number of output variables $y_i$ are two, and the number of fuzzy logic linguistic rules are 20 and these variables and functions are stored in a single of the memory circuit. In this case, 100 numbers of membership functions are needed. If the single membership function is represented by $2^8 \times 8$ bits, the memory capacity required is totally calculated as $2^8 \times 8 \times 100$. That is to say, 200 K bit RAM (Random Access Memory) is required.

In the case of the specific structure of rule logic disclosed in the above-identified English literature, about 0.48 million number of transistors (about 70%) from among about 0.69 million number of transistors on the single IC chip are provided as a memory unit. On the other hand, if the memory unit is provided as an external side of the IC chip, an overhead in access occurs and the fuzzy inference speed becomes remarkably slow.

In addition, if a resolution per single membership function is reduced, a quantization error may become remarkable depending on the contents of control although the memory capacity becomes decreased.

Next, if the fuzzy inference calculation portion (Rule logic) is configured in the parallel processing type, the circuit shown in the above-identified English literature needs to be arranged in parallel and the circuit scale becomes large. The rule logic described above is in a unit of four bits. If a larger resolution is required, the circuit scale becomes large so that the large scale rule logic cannot be put into practice in the viewpoint of consumed power and yield.

As described above, it is essential to eliminate the various problems in order to integrate the fuzzy logic controller into the practical IC chip. In the type of bit-serial processing of the rule logic shown in the above-identified English literature, the fuzzy inference speed becomes slow as the number of rules is increased. Consequently, an advantage of manufacturing an exclusive use chip (self-contained chip) becomes reduced.

SUMMARY OF THE INVENTION

It is, therefore, an object of the present invention to provide an arithmetic/logic operating circuit for a fuzzy control purpose which enables a high speed fuzzy inference with a less memory capacity.

The above-described object can be achieved by providing a circuit for calculating a fuzzy inference for a fuzzy logic controller, comprising: a) a first memory adapted for storing a plurality of membership functions whose number corresponds to the number of fuzzy levels for at least one input variable to be subjected to the fuzzy inference; b) a second memory adapted for storing a plurality of encoded fuzzy control linguistic rules; c) first means for accessing the first memory to retrieve all membership functions for the respective fuzzy levels, with the input variable used as addresses of the membership functions to be retrieved and for accessing the second memory to retrieve data of the encoded fuzzy control linguistic rules from the second memory; d) a plurality of registers adapted for temporarily storing data from the first memory which are read during the access by the first means and for temporarily storing data from the second memory which are read during the access by the first means so that data for executing the fuzzy inference are prepared; and, e) second means for executing the fuzzy inference using data retrieved from the first memory in the registers which are synthesized with the data retrieved from the second memory.

The above-described object can also be achieved by providing a circuit for calculating a fuzzy inference for a fuzzy logic controller, comprising: a) a first memory in which a plurality of membership functions whose number corresponds to the number of fuzzy levels for a plurality of input variables to be subjected to the fuzzy inference are stored; b) a second memory in which a plurality of encoded fuzzy control linguistic rules are stored; c) a first circuit which is capable of accessing the first memory to retrieve all membership functions for the respective fuzzy levels, with the respective input variables used as addresses, and capable of accessing the second memory to retrieve the required linguistic rules; d) a plurality of registers in which data from the first memory which are read during the access by the first means are registered and which are synthesized with the data derived from the second memory; and, e) a second circuit in which fuzzy inferences using the synthesized data from the data temporarily stored in the registers are sequentially executed.

BRIEF DESCRIPTION OF THE DRAWINGS

FIG. 2 is an explanatory view of a structure of a memory circuit of a rule logic of an arithmetic/logic operating circuit applicable to a fuzzy logic controller in a first preferred embodiment according to the present invention.

DETAILED DESCRIPTION OF THE PREFERRED EMBODIMENTS

Reference will hereinafter be made to the drawings in order to facilitate a better understanding of the present invention.

Previously proposed structures of fuzzy logic controller. MIN unit, rule logic, and defuzzifier are exemplified by an English literature titled "A VLSI Fuzzy Logic Controller with Reconfigurable, Cascadable Architecture" of IEEE Journal of Solid-State Circuits, Vol. 25, No. 2 on April, 1990, the disclosure of which is herein incorporated by reference.

FIG. 2 shows a first preferred embodiment of a memory circuit applicable to a fuzzy logic controller according to the present invention.

In the first preferred embodiment, the memory circuit includes a first memory 1, a register group 5, a second memory 6, and a register 7. The register group 5 registers output data from the first memory 1. The register 7 temporarily stores a synthesized data. In addition, the register 7 includes a tag portion 7-A and data portion 7-B.

Figure 3:
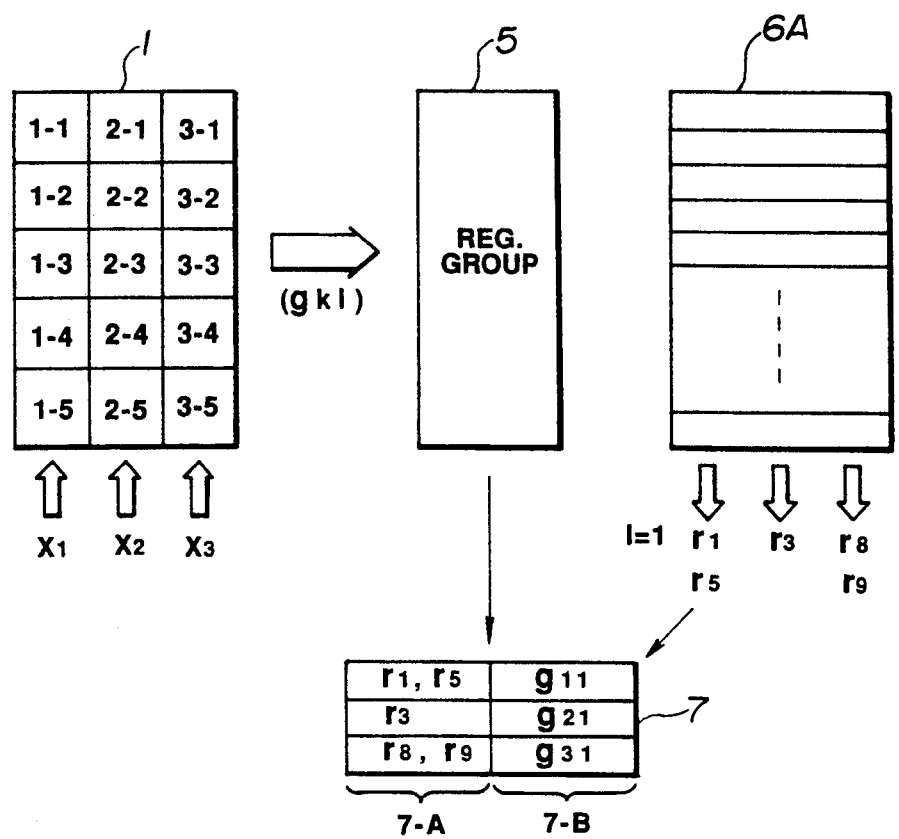
FIG. 3 is an explanatory view of the structure of the memory circuit of the rule logic of the arithmetic/logic operating circuit in a second preferred embodiment according to the present invention.

FIG. 3 shows a second preferred embodiment of the memory circuit applicable to the fuzzy logic controller according to the present invention.

In the second preferred embodiment, the second memory 6A is a type of memory in which the contents of memory indicates the corresponding address. The other structures except the second memory 6A are the same as those in the first preferred embodiment.

Figure 4:
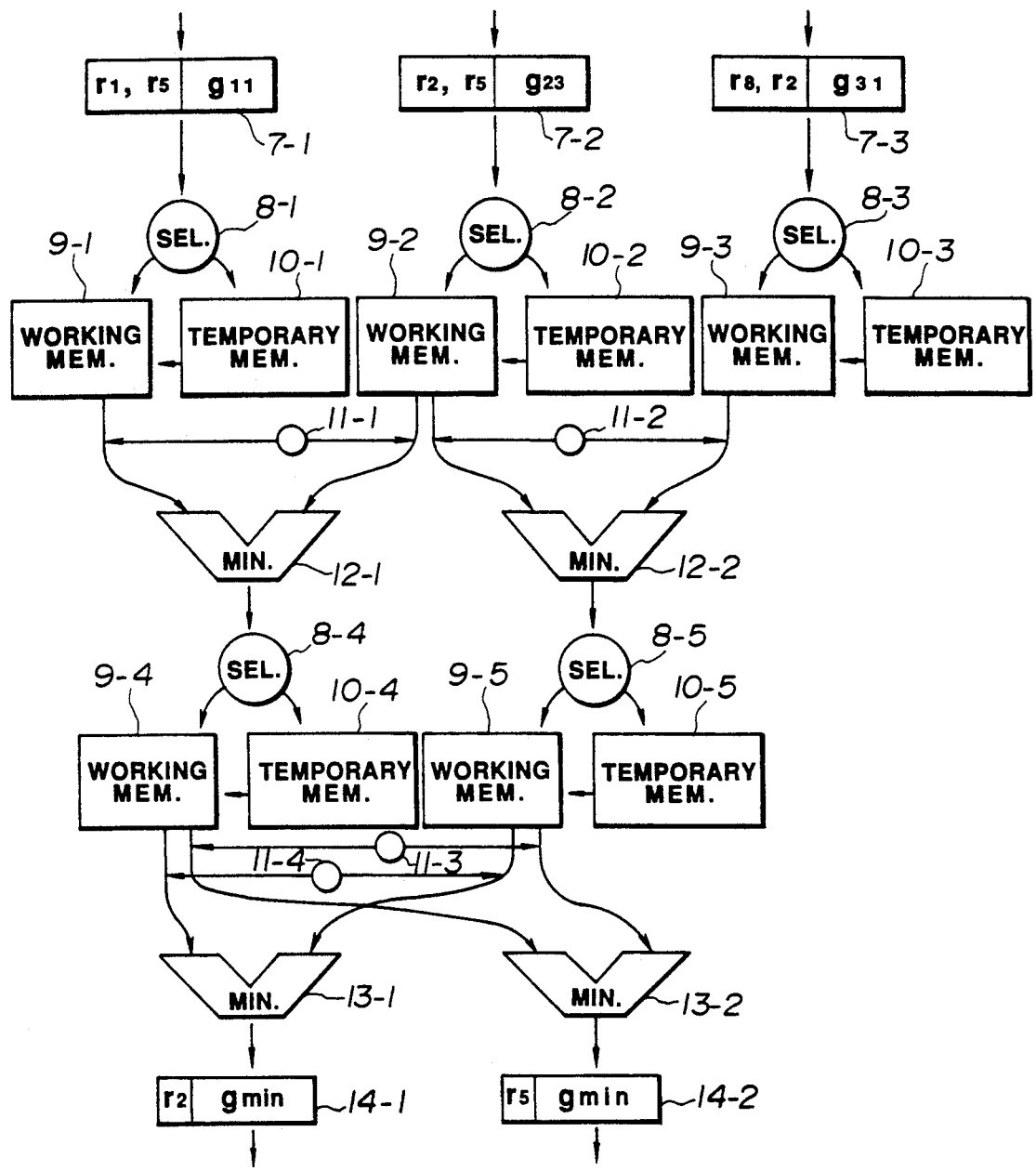
FIG. 4 is an explanatory view of the rule logic in a third preferred embodiment according to the present invention.

FIG. 4 shows a third preferred embodiment of a structure of a fuzzy inference executing circuit.

In the third preferred embodiment, the fuzzy inference executing circuit includes a plurality of registers 7, selectors 8, working memories 9, temporary memories 10, que generators 11, MIN calculators 12 and 13, and registers 14.

The structure of the memory circuit in the first preferred embodiment will be described below with reference to FIG. 2.

The first memory 1 stores a plurality of membership functions.

At this time, the membership functions whose numbers correspond to those of fuzzy levels with respect to the input $x_1$ through $x_3$ are written into the first memory 1.

That is to say, if the level number is 5, five stages of the membership functions such as $x_1$ is large , $x_1$ is small , $x_1$ is approximately zero , $x_1$ is negatively small , and $x_1$ is negatively large are stored in the first memory 1. In addition, since $x_2$ is large and $x_1$ is large are generally different fuzzy sets, it is necessary to make correspondence for the respective inputs. Hence, as shown in FIG. 2, $3 \times 5 = 15$, i.e., 15 numbers of membership functions are stored. If each membership functions is represented by $2^8 \times 8$ bits. The capacity of the first memory may be 30 k bits and is not dependent on the number of rules N.

Each membership function is stored in a corresponding memory location 1-1~1-5, 2-1~2-5, 3-1~3-5 of the first memory 1. The input $x_{1-1}$, serves as an address of the longitudinal memory locations 1-1, 1-2, 1-2, 1-3, 1-4, and 1-5 so as to access them in a parallel mode (may be accessed in a serial mode). In the same way, each of the other memory locations 2-1~2-5, 3-1~3-5 is accessed in the parallel mode with each of inputs $x_2$, $x_3$ as address.

Although, in the previously proposed memory circuit described in the Description of background art of the specification, the inputs are the membership functions, the addresses are assigned by crisp values of $x_1$, $x_2$, and $x_3$ (also called single tones). Hence, the first memory 1 has $8 \times 3 = 24$ bits of addresses and has output lines of $8 \times 5 \times 3 = 120$ bits (40 bits when serially accessing for the inputs). The 15 numbers of grades $\{g_{KL}\}$ are temporarily stored in the register group 5.

On the other hand, the second memory 6 stores the linguistic control rules in encoded forms.

That is to say, for such a linguistic rule as if $x_1 = A_{1i}$ and $x_2 = A_{2i}$ and $x_3 = A_{3i}$, then $Y_1 = B_{1i}$, $Y_2 = B_{2i}$, 000~100 are applied to $\{A_{1i}\}$ when the levels of $\{A_{1i}\}$ are five. Hence, a total of 15 bits functions as data of three condition parts and two conclusion parts in one of the linguistic rules described above. Then, if 100 numbers of the linguistic control rules are stored, the total capacity of the second memory 6 is only $15 \times 100$ bits, i.e., about 1.46 kilo bits.

When the second memory 6 is accessed to read out once some numbers of the linguistic rules, the fuzzy levels in the respective linguistic control rules are output in the forms of encoded data. If grades $g_{KL}$ of the corresponding levels are added to the respective input $x_1$, $x_2$, and $x_3$ so as to be exemplified in the registers 7. consequently, the data for executing the series of fuzzy inferences are prepared in the registers 7.

Alternatively, an address decoder may be provided for the register group 5 to retrieve the corresponding $g_{KL}$ from the register group 5 and to transmit them directly to the rule logic. However, in the alternative case, the speed of executing the fuzzy inference becomes reduced due to its serial operation.

Figures 1, 5:
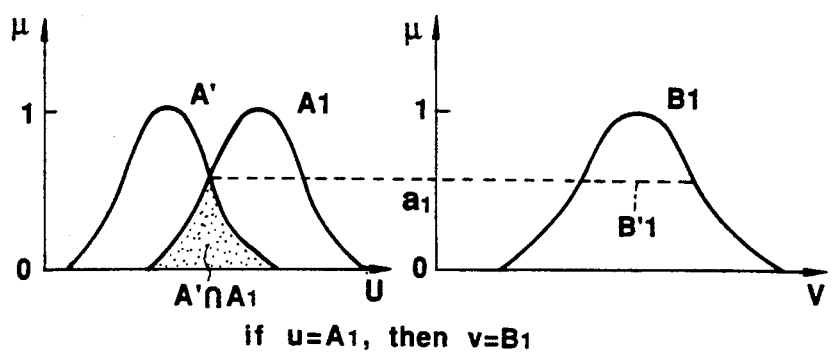
FIG. 1 is examples of membership function table and related fuzzy control linguistic rule.
FIG. 5 is an explanatory view of the structure of the memory circuit which is a modification of the memory circuit of the first preferred embodiment.

It is noted that, as shown in FIG. 5, each level of condition parts and conclusion parts may alternatively serve as an address of the second memory 6.

That is to say, the memory 6 is constituted by three memory blocks corresponding to the inputs, $x_1$, $x_2$, and $x_3$. Each memory block is provided with five addresses from (000) to (100).

Then, in each address, a single linguistic rule which uses the corresponding address, i.e., the corresponding level is stored in the form of encoded data whose predetermined bit portion(s) is indicated by "1".

Since the predetermined bit portion(s) of each rule comprising 7 bits is indicated by "1" so that the corresponding level (for example, $x_1$ is large or $x_2$ is intermediate ) is used in the linguistic control rule, the fuzzy inference of the single If portion can be executed when the data indicating "1" (s) at the same predetermined portion(s) are collected.

Next, the operation of the second preferred embodiment will be explained with reference to FIG. 3.

In the second preferred embodiment, the second memory 6 is a type of memory called a content-addressed memory (CAM) (a memory where memory locations are identified by their contents rather than their addresses). In the same way as shown in FIG. 2, the register group 5 stores grades $g_{KL}$. On the other hand, in the case of the second memory 6', addresses in which the contents of the level L=1 are inserted (i.e., rule number $r_1 \sim r_N$) are read for the respective inputs.

In the example shown in FIG. 3, it is indicated that, for the input $x_1$, the level L (=1) belongs to the rule $r_1$ and rule $r_5$. In the same way, for the input $x_2$, the level L=1 belongs to the rule $r_3$. For the input $x_3$, the level L=1 belongs to the rule $r_8$ and rule $r_9$. If these data are stored in the registers 7 in parallel to the grade $\{g_{K1}\}$. Therefore, the grade value on the level 1 and the rule number containing the grade value are arranged properly in the registers 7. In the registers 7, the rule numbers are registered in tag 7-A, the grade values are registered in tag 7-B in the format of tagged data. If these operations are repeated until the level 5 is reached, the necessary data for the condition part fuzzy inference are prepared. Thereafter, the same rule number is searched with respect to the difference inputs to compare them during the logic calculation.

Next, the operation of the third preferred embodiment will be described with reference to FIG. 4.

In the third preferred embodiment, the rule logic is a type of data flow by external device.

The calculation in the data flow type can handle data present in the registers 7 of FIG. 3 to permit a parallel processing flow.

The data, in this case, may be distributed into respective calculators according to the rules.

In details, the respective registers 7-1~7-3 provide tagged data (rule number attached grade value) for the respective levels, as shown in FIG. 3. These outputs are fed into corresponding selectors 8-1, 8-2, and 8-3 which select them into data to be compared and the others. The selected data are fed to respective working memories 9-1, 9-2, and 9-3 and the other data are fed to respective temporary memories 10-1, 10-2, and 10-3. In the example of FIG. 4, the parallel processing for even number rules and odd number rules is executed. The working memory 9-1 receives the data of the even number rules. The working memory 9-2 receives both data of the even and odd number rules and the working memory 9-3 receives the data of the odd number rules all data being with priority. Next, the que generators 11-1, 11-2 confirm that the same number rules are prepared and transmit them to the connected Min units 12-1, 12-2 in the parallel mode so that the Min units 12-1, 12-2 output the minimum values of the two grades within the same rules.

Upon receipt of the outputs of the Min units 12-1, 12-2, the selectors 8-4, 8-5 at the subsequent stage thereof, working memories 9-4, 9-5, temporary memories 10-4, 10-5, que generators 11-3, 11-4 are operated. Furthermore, Min units 13-1, 13-2 derive the minimum values of grades in parallel to each other of the odd and even number rules and transmit them to the subsequent registers 14-1, 14-2.

In the way described above, two parallel processings are carried out as shown in FIG. 4. Further parallel processings exceeding two may be carried out. As the number of parallel calculators is increased, the advantages of processing in the data flow type are exhibited. That is to say, the data distributions enable semi-automatically fuzzy inferences for the respective rules.

As described hereinabove, in the fuzzy logic controller according to the present invention, data memories storing data used to execute the fuzzy inference of the condition parts are divided into the memory for storing the membership functions whose numbers are dependent on the number of the fuzzy levels and the memory for storing the encoded fuzzy control linguistic rules. Then, since the respective levels are collectively accessed for the respective inputs, the resulted grades are stored into the register group, and the data on the grades reading the rules from the memory which stores the fuzzy control linguistic rules are read so as to synthesize the data on the grades with the read linguistic rules, the memory capacity can remarkably be reduced without reduction of the fuzzy inference executing speed. In addition, since the memory capacity becomes low, the data write operation into the memory locations can be saved. Furthermore, the yield of manufacturing the IC chip and testing facility can be improved.

Furthermore, since the memory type for storing the linguistic rules is the content-addressed memory (CAM) and the rule logic portion is of the type of data flow, the fuzzy inference working can effectively be carried out and high speed fuzzy inference can be achieved.

It will fully be appreciated by those skilled in the art that the foregoing description has been made to the preferred embodiment and various changes and modifications may be made without departing from the scope of the present invention which is to be defined by the appended claims.

What is claimed is:

1. A circuit for calculating a fuzzy inference for a fuzzy logic controller, comprising:
   a) a first memory which is so constructed as to store a plurality of membership functions for each input variable, the number of the membership functions for each input variable being the same as the number of fuzzy levels;
   b) a second memory which is so constructed as to store a plurality of encoded fuzzy control linguistic rules in a series of bit format, the number of bits per encoded fuzzy control linguistic rule depending on the fuzzy levels for each input variable;
   c) first means for accessing the first memory to retrieve the membership functions for the respective fuzzy levels, with the input variable used as address of the membership functions to be retrieved and for accessing the second memory to retrieve data of the encoded fuzzy control linguistic rules from the second memory;
   d) a plurality of registers, each for temporarily storing the accessed data from the first memory which are read during the access to the first memory by the first means according to the number of fuzzy levels and for temporarily storing encoded data from the second memory which are read during the access to said second memory by the first means so that data for executing the fuzzy inference are prepared thereat; and,
   e) second means for executing the fuzzy inference using the data retrieved from the first memory in the registers which are added to the data retrieved from the second memory in the corresponding register.

2. A circuit for calculating a fuzzy inference for a fuzzy logic controller as set forth in claim 1, wherein the input variable is plural and wherein said second memory stores the encoded linguistic control rules which are represented by such a single sentence as follows:

IF $x_1 = A_{1i}$ and $x_2 = A_{2i}$ and $x_3 = A_{3i}$,
   THEN $Y_1 = B_{1i}$, $Y_2 = B_{2i}$, wherein $x_1$, $x_2$, and $x_3$ denote the input variables, $A_{1i}$, $A_{2i}$, and $A_{3i}$ denote the fuzzy levels for the respective input levels, $B_{1i}$ and $B_{2i}$ denote the fuzzy levels for output variables of $Y_{1i}$ and $Y_{2i}$, the symbol i denotes a serial number of rules, and $x_1 = A_{1i}$, $x_2 = A_{2i}$, $x_3 = A_{3i}$, $Y_1 = B_{1i}$, and $Y_2 = B_{2i}$ denote respective membership functions.

3. A circuit for calculating a fuzzy inference for a fuzzy logic controller as set forth in claim 2, wherein said second memory has a plurality of memory locations each of which stores the encoded data of one of the linguistic control rules and wherein each of the memory locations stores a total of $(n+m) \times k$ bits constituted by n conditions parts and m conclusion parts of the one linguistic rule with each of the fuzzy levels $\{A_{1i}\}$ being represented by k-bit coding.

4. A circuit for calculating a fuzzy inference for a fuzzy logic controller as set forth in claim 3, wherein a memory capacity of the second memory is $(n+m) \times k \times j$ bits when the number of the linguistic rules is j wherein n, m, and k are defined in claim 3.

5. A circuit for calculating a fuzzy inference for a fuzzy logic controller as set forth in claim 4, wherein said first memory includes i memory locations for each input variable, each memory location storing one of i membership functions and each membership function being represented by $2^q \times q$ $(=p)$ bits, and the total capacity of the first memory is at least $p \times i \times n$ bits.

6. A circuit for calculating a fuzzy inference for a fuzzy logic controller as set forth in claim 5, wherein said first memory has addresses of $q \times n$ bits and output bus lines of $q \times i \times n$ bits and wherein $i \times n$ number of grades derived from the first memory $\{g_{KL}$, wherein K denotes one of the input variables and L denotes the number of fuzzy levels$\}$ are registered into a register group constituting the plurality of registers.

7. A circuit for calculating a fuzzy inference for a fuzzy logic controller as set forth in claim 6, wherein the plurality of registers include a register which temporarily stores the encoded data of the levels of the respectively specified linguistic rules retrieved from the second memory by the third means to which one of the grades which corresponds to each level so that data to be subjected to the fuzzy inference of the condition parts are prepared.

8. A circuit for calculating a fuzzy inference for a fuzzy logic controller as set forth in claim 1, wherein said second memory comprises a content-addressed memory and wherein a linguistic control rule number for each input variable is read from the second memory and is added to the data stored in said registers as a tag so that the tagged data are generated thereinto, the tagged data being transmitted to said second means.

9. A circuit for calculating a fuzzy inference for a fuzzy logic controller as set forth in claim 8, wherein said second means includes: a data flow type calculator for selecting and preparing the respective fuzzy logic linguistic rules upon receipt of the tagged data from the registers; and a comparator which calculates a comparison when the data have been prepared for the respective rules so that the fuzzy inferences are carried out sequentially when the data are prepared in the calculator.

10. A circuit for calculating a fuzzy inference for a fuzzy logic controller as set forth in claim 1, wherein said second memory includes: three memory blocks for the three input variables ($x_1$, $x_2$, $x_3$), each block having five addresses corresponding to five levels represented by 000 through 100, each address having a memory location storing the corresponding encoded data of the linguistic control rule in a predetermined bit portion of which a bit 1 is provided for indicating that the corresponding level is used.

11. A circuit for calculating a fuzzy inference for a fuzzy logic controller as set forth in claim 10, wherein said first means retrieves the data of the specified addresses from the second memory and transmits then to the registers so as to prepare the data having the same predetermined bit portions indicating the bit 1 to execute the fuzzy inference by the second means.

12. A circuit for calculating a fuzzy inference for a fuzzy logic controller in which a fuzzy inference is executed using membership functions having the plurality of fuzzy levels on the basis of a predetermined linguistic control rule, comprising:
  a) a plurality of first memories, each storing a plurality of the membership functions whose number depends on a number of fuzzy levels for a corresponding one of a plurality of input variables ($x_1 \sim x_3$);
  b) a plurality of second memories, each storing the linguistic control rule;
  c) accessing means for accessing the first memories, with each input variable being served as a corresponding address, to retrieve the data on the first memories therefrom in terms of the corresponding fuzzy level;
  d) at least one register which is so constructed as to temporarily store the read data from said plurality of first memories during the access by means of the accessing means;
  e) fuzzy inference executing portion which executes the fuzzy inference by adding the data temporarily stored in the register to the data stored in each of said plurality of second memories.

13. A circuit as set forth in claim 12, wherein each of said second memories comprises a content-addressed memory, wherein said accessing means reads the control rule number ($r_1 \sim r_N$) for each input variable, and wherein said register prepares a tagged data in which a tag portion is said linguistic control rule and is added to the data stored in the register, said tagged portion being transmitted to said fuzzy inference executing portion.

14. A circuit as set forth in claim 13, wherein said fuzzy inference executing portion comprises a data flow type calculator, upon receipt of the tagged data from the register, for selecting each linguistic rule and preparing the data for each control linguistic rule; a comparator for comparing each data for the corresponding rule, the fuzzy inference being executed in an order in which the data has been prepared.

15. A circuit for calculating a fuzzy inference for a fuzzy logic controller, comprising:
  a) a first memory in which a plurality of membership functions are stored for each of plurality of input variables, the number of the membership functions for each input variable being the same as the number of fuzzy levels;
  b) a second memory in which a plurality of encoded fuzzy control linguistic rules are stored in a bit series format, the number of bits per encoded fuzzy control linguistic rule depending on the fuzzy levels for each input variable;
  c) a first circuit for accessing the first memory to retrieve the membership functions for the respective fuzzy levels, with the input variable used as addresses of the membership functions to be retrieved, and capable of accessing the second memory to retrieve data of the encoded fuzzy control linguistic rules;
  d) a plurality of registers for temporarily storing the accessed data read out from the first memory during the access by the first circuit and which are added to the data retrieved from a corresponding register in the second memory; and
  e) a second circuit for sequentially executing fuzzy inferences using the data temporarily stored in the plurality of registers.

* * * * *